United States Patent
Bartel et al.

[11] Patent Number: 6,056,076
[45] Date of Patent: *May 2, 2000

[54] CONTROL SYSTEM FOR AN AUTOMOTIVE VEHICLE HAVING AT LEAST ONE ELECTRICALLY OPERATED DOOR LOCK

[75] Inventors: Peter Bartel, Hattingen; Wilfried Ostermann, Essen, both of Germany

[73] Assignee: Kiekert A.G., Heiligenhaus, Germany

[*] Notice: This patent is subject to a terminal disclaimer.

[21] Appl. No.: 08/911,264

[22] Filed: Aug. 14, 1997

[30] Foreign Application Priority Data

Aug. 17, 1996 [DE] Germany .......................... 196 33 202

[51] Int. Cl.[7] .................................................. F02N 11/08
[52] U.S. Cl. .......................... 180/167; 180/271; 180/287
[58] Field of Search .................................. 180/65.3, 65.1, 180/287, 281, 282, 271, 167; 307/18, 23, 43, 64, 66

[56] References Cited

U.S. PATENT DOCUMENTS

| | | | |
|---|---|---|---|
| 4,236,594 | 12/1980 | Ramsperger | 180/167 |
| 4,926,332 | 5/1990 | Komuro et al. | 364/424.05 |
| 4,940,964 | 7/1990 | Dao | 340/438 |
| 5,203,112 | 4/1993 | Yamagishi et al. | 49/280 |
| 5,497,641 | 3/1996 | Linde et al. | 70/257 |
| 5,521,443 | 5/1996 | Imura et al. | 307/10.2 |
| 5,547,208 | 8/1996 | Chappell et al. | 180/281 |
| 5,552,641 | 9/1996 | Fischer et al. | 307/10.5 |
| 5,552,642 | 9/1996 | Dougherty et al. | 307/10.3 |
| 5,736,793 | 4/1998 | Jahrsetz et al. | 307/10.1 |
| 5,751,072 | 5/1998 | Hwang | 307/10.4 |

FOREIGN PATENT DOCUMENTS

| | | |
|---|---|---|
| 35 26 501 | 2/1987 | Germany . |
| 195 30 721 | 8/1995 | Germany . |
| 44 27 253 | 2/1996 | Germany . |

*Primary Examiner*—Paul N. Dickson
*Assistant Examiner*—Bridget Avery
*Attorney, Agent, or Firm*—Herbert Dubno

[57] ABSTRACT

An electrical control system for a vehicle having electrically operated locks provides at each door an emergency unit built into the respective lock and having a power storage unit continuously connected between the starter battery and the motor driver for the lock, and a voltage limiter reducing the voltage applied to the storage unit and the motor driver from that of the storage battery.

8 Claims, 4 Drawing Sheets

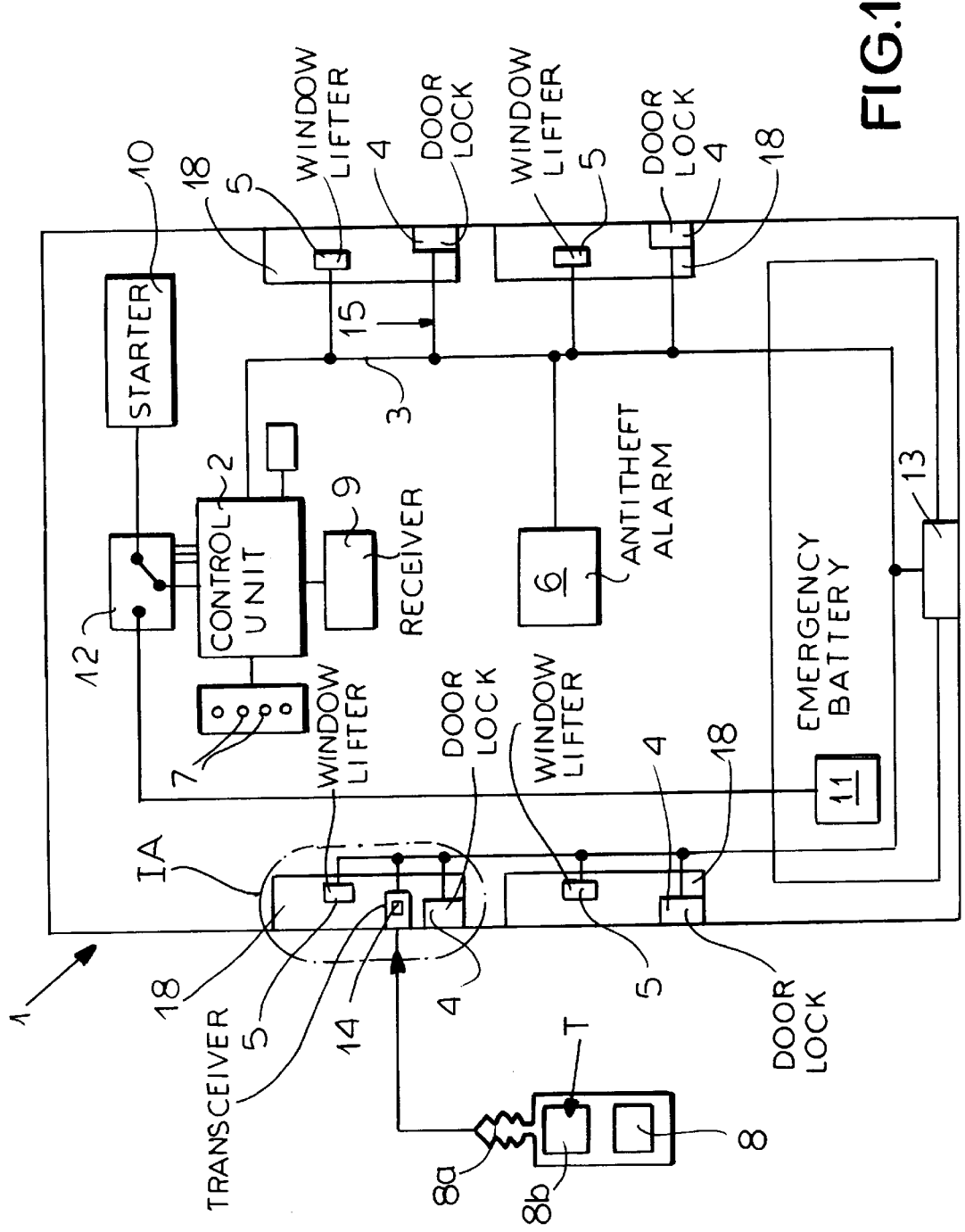

CONTROL SYSTEM FOR AN AUTOMOTIVE VEHICLE HAVING AT LEAST ONE ELECTRICALLY OPERATED DOOR LOCK

FIELD OF THE INVENTION

The present invention relates to a control system for an automotive vehicle and, particularly, for electrically operated components thereof and especially an electrical locking system having at least one electrically operated door lock.

BACKGROUND OF THE INVENTION

It is fairly common practice to provide automotive vehicles with electrical systems which can operate door locks and other components, including antitheft systems, utilizing a remote unit which can be actuated by the operator and may, for example, be provided with a key which can operate an electrical switch or a mechanical lock or both.

In such electrical control systems for a vehicle, a control unit is provided which may be connected by appropriate lines with the electrically actuatable motor driver for the mechanical components of the or each electrically operated door lock and optionally with other vehicle components.

The control unit itself may be associated with actuators fixed on the vehicle, e.g. push button switches, which may be utilized to operate the door locks and such other components like the window lifters, locks for various vehicle compartments and even accessories such as electrically operates seats, memory and the like. The unit may in addition respond to a remote actuator, an actuator which can transmit signals to the vehicle in a wireless manner, i.e. by radiowaves, ultrasonics or infrared waves.

In general, such a control unit is supplied with electrical energy from the starter battery of the vehicle and the vehicle may be equipped with an emergency switchover device cooperating with an emergency energy source which, upon failure of the starter battery because it is damaged, missing or insufficiently charged, enables at least one of the vehicle door locks to be operated.

The individual door locks can be provided with electrical servomotors or stepping motors or motors with step down gearing which are operatively connected to the wheels, segments, levers or the like making up the mechanical parts of the lock. In addition, each lock will normally have a motor driver which is energized via the control unit and which, in turn, applies the appropriate signals for operating the lock motor. The term "motor driver" as here used applies to the motor itself, the motor in connection with any step-down gearing which may be required, and any electronic circuitry required in association with the particular motor. The emergency circuitry can include at least one measuring circuit network which can measure the voltage of the starter battery and switchover to the emergency power source when a voltage is detected by this sensor which is below a normal starter battery voltage and threatens to be incapable of operating the electrical units of the system. Instead of a discrete emergency circuit, the emergency operations can be effected by a program of the vehicle computer which can respond to a diminution of the starter battery voltage below a certain threshold. In other words the emergency circuitry becomes effective upon the development of an undervoltage, namely, a voltage at the starting battery below which control functions of the control unit cannot be reliably effected. A typical undervoltage at which such emergency source operation is triggered may be, in the case of a normal 12 volt vehicle battery system, say 11.4 volts.

It will be understood that the emergency functions which have been described should be effected not only in the case of an effectively discharged battery but also in the case of electrical separation of the starter battery from the vehicle, i.e. upon theft of the starter battery or its removal for other reasons. In the case of a starter battery separated from the vehicle the voltage measurement circuit registers a fictitious voltage of 0 volts. Systems of the aforedescribed type are available in a variety of configurations. For example, in one such system as described in German Patent Document DE 19 530 721 A1 (corresponding to U.S. patent application Ser. No. 08/661,485, filed Jun. 11, 1996, U.S. Pat. No. 5,736,793 of Apr. 7, 1998 a single emergency battery and a central emergency circuit is provided. The device is so arranged that, upon the development of the aforementioned undervoltage, the emergency circuitry will decouple the control unit from the starter battery and connect the emergency battery to the control unit.

The electrically operated components of the vehicle as described in this patent document include, so-called basic components and so-called comfort components. The basic components include the vehicle door locks and usually also the antitheft system. Comfort components can include those which need not be operated when there is insufficient power available, for example window lifters, compartment heating or cooling and the like.

Upon the development of an emergency situation, calling for use of the emergency power source, in general, the comfort components are deactivated so that the energy of the emergency source can satisfy the need for operation of the basic components as long as possible. The emergency energy source can be a battery, e.g. a so-called primary battery, an accumulator or storage or secondary battery, or even a condenser or capacitators. The emergency energy supply is thus fixed and dimensioned to supply the basic vehicle components with electrical energy upon the discharge of the starter battery or some other act which may render it incapable of functioning. The emergency battery can be provided in the interior of the vehicle or even in the trunk or luggage compartment, i.e. in a more secure location than the starter battery which normally is found in the engine compartment. The emergency energy source, when located in the interior of the vehicle thus is better protected in the case of a crash and has a higher probability of being undamaged so that it can be a source of energy for the lock when the latter must be actuated from the exterior of the vehicle by a remote operator in the case of such a crash or when the vehicle must be opened from the exterior upon failure of the starter battery.

EP 0 694 665 A1 describes another control system wherein the emergency system is subdivided into a multiplicity of emergency units, each of which can have an emergency circuit and an emergency energy source. The individual emergency units may be associated with respective vehicle door locks and can even be built into the corresponding vehicle door or vehicle door lock. This increases the reliability of the emergency system in the case of a crash since it is highly probable that at least one vehicle door lock will be unaffected in the event of such a crash. Put otherwise, it is highly improbale, in the case of a crash, that all of the door locks will be adversely affected and hence that the emergency source and circuit of every lock will be unavailable to enable the opening of the door.

In this system, however, the emergency energy source must be equipped to receive charge from a generator or alternator of the vehicle or the starter battery with a voltage which can range from 9–20 volts and, as a consequence, the emergency energy source must be relatively bulky and must work with comparatively large units, such as motor drivers which are dimensioned to operate at the high voltages. It is a problem to build such units and the bulky sources required for emergency purposes into vehicle door locks.

OBJECTS OF THE INVENTION

It is, therefore, the principal object of the present invention to provide a control system for an automotive vehicle which will overcome the drawbacks of earlier systems as described and, in particular, will enable reliable emergency operation with components dimensioned to be distributed in the automotive vehicle doors or door locks.

Another object of the invention is to provide an improved control system with an emergency circuitry which facilitates incorporation of at least key parts of that system in the vehicle door locks.

It is another object of this invention to so improve upon the systems described above that incorporation of the components for emergency operations can be more effectively built into the door locks in a simple manner.

SUMMARY OF THE INVENTION

These objects and others which will become apparent hereinafter are attained, in accordance with the invention by providing an electrical control system for an automotive vehicle in which the control system has a control unit connected via at least one electric line to at least one electrically operated door lock having its motor driver built into and optionally operating other vehicle components as well.

As in the past the control unit can be connected to actuators fixed on the vehicle and/or can be operated with the aid of a remote actuator for controlling the vehicle components and the control unit is connected to a starter battery for supplying the control unit with electrical energy.

The system includes an emergency unit with emergency circuitry and emergency energy sources at least for one of the vehicle locks and, preferably, for all the door locks of the vehicle and the emergency system can include a multiplicity of emergency units each of which includes an emergency circuit and an emergency energy source, whereby the emergency unit has individual door locks respectively associated with each such unit so that the emergency system is, at least to that extent, decentralized, although a centralized emergency lock actuating system can be provided as well.

According to the invention, the emergency energy sources of the respective emergency units are continuously connected between the starter battery of the vehicle and the motor driver and a transistor circuit is provided which reduces the voltage for the motor driver from the starter battery voltage to a motor driver voltage which can be significantly below the starter battery voltage, say a reduction of 30% to 70% of the starter battery voltage.

The invention can be embodied in various ways. In one embodiment, for example, each vehicle door lock of the vehicle can have a respective emergency unit built into it. The emergency unit can be a module which can be mounted in or on the door lock. In a preferred embodiment of the invention, the emergency unit can be provided on a component circuit board or circuit unit which is built into the door lock housing or mounted thereon.

Especially for functional reliability and antitheft purposes, the door lock assembly itself may be of closed construction e.g. as described in German Patent Documents DE 35 26 501 C2, (corresponding to U.S. Pat. No. 4,735, 447, issued Apr. 5, 1988, DE 44 27 253 C2 (corresponding to U.S. Pat. No. 5,623,170, issued Apr. 22, 1997.

In this closed configuration, the major part of the lock mechanism is received within a housing in which the emergency unit is encapsulated as well. As a consequence, the emergency unit forms part of the lock, is not accessible from the exterior except upon removal of the entire lock housing and precludes undesirable intervention by unauthorized individuals.

With the system of the invention, the emergency energy source individual to each lock can be maintained in charge via the generator or alternator of the vehicle, usually directly, or indirectly by being connected to the starter battery which can thus maintain the charge.

It will be understood, as has been inferred previously that the individual emergency power sources assigned to the individual locks may be provided in addition to a common emergency power source for the basic components when switchover to such central emergency source is required by failure of the starter battery as has been described previously.

The central emergency source, as has been noted, can be received in the body or passenger compartment of the vehicle, elsewhere from the engine compartment, or in the trunk or luggage compartment.

BRIEF DESCRIPTION OF THE DRAWING

The above and other objects, features, and advantages will become more readily apparent from the following description, reference being made to the accompanying drawing in which:

FIG. 1 is a block diagram of a control circuit according to the invention;

SPECIFIC DESCRIPTION

Figure 1A:
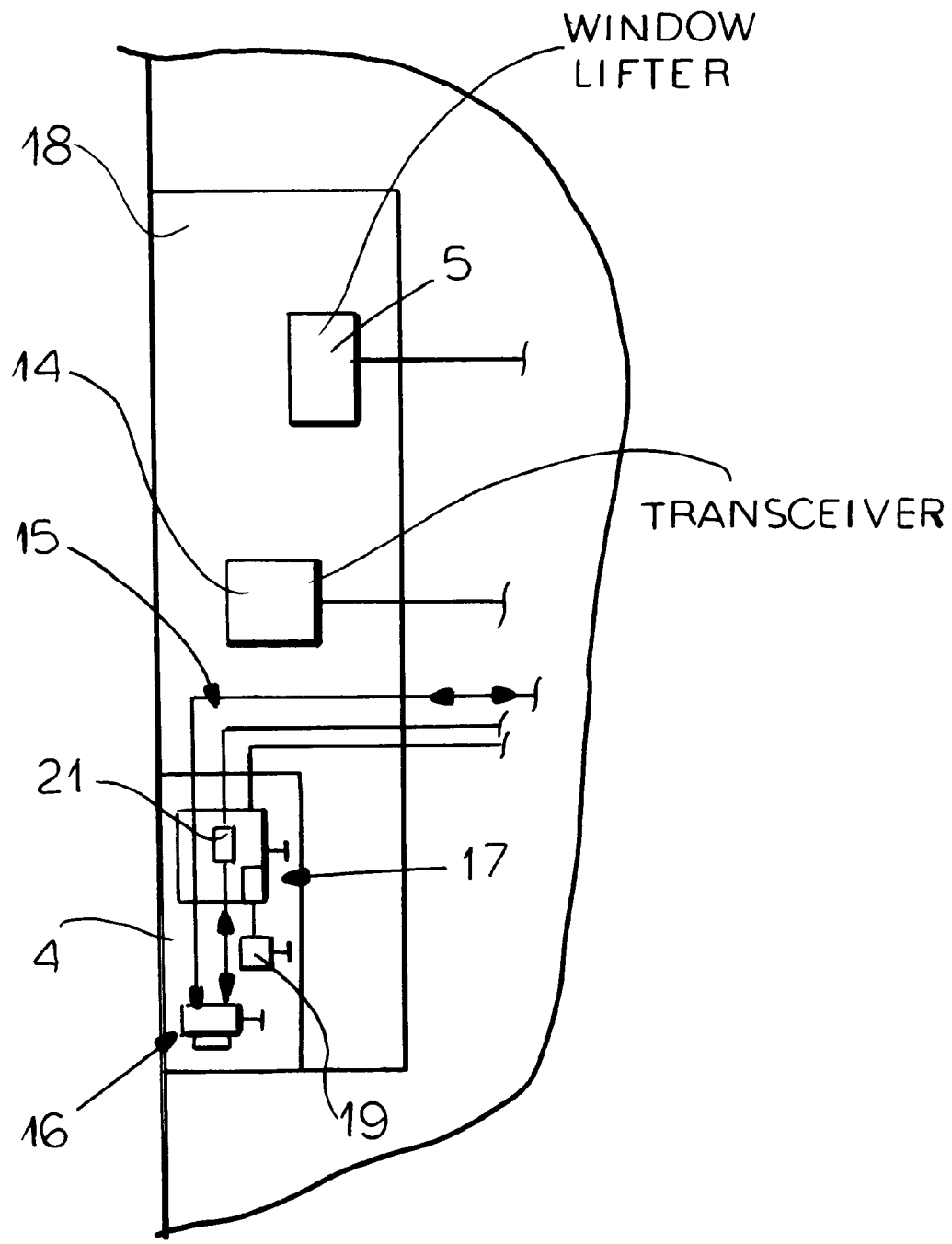
FIG. 1A is an enlarged detail view of the portion IA of FIG. 1.

FIG. 1 diagrammatically shows a vehicle 1 with a control system according to the invention which can comprise a control unit 2 for the electrical circuitry. The control unit 2 may work into a multiplex single line bus 3 as described, for example, in German Patent Document DE 19 530 721 (corresponding to U.S. Pat. No. 5,736,793 and which serves to communicate between the control unit 2 and the plurality of door lock units 4, the nonessential components or comfort components like the window lifters 5 and other essential or basic components such as the antitheft warning system 6.

To operate the functions of the control unit 2, electrical actuators 7, such as switches or pushbuttons are connected to the control unit or the vehicle. These actuators may be considered fixed actuators. The control unit 2 can also be actuated by a remote control unit T carried by the vehicle operator and which may have a transmitter 8 also operated by a pushbutton. The remote unit can be part of a key, a blade 8a of which can operate a mechanical or switch lock of at least one of the doors.

To receive signals from the remote control unit T, a receiver 9 is coupled to the control unit 2.

The vehicle is also equipped with a starter battery 10 which may be charged by the alternator or generator of the vehicle (not shown), usually received in the engine compartment and connected to the control unit 2 by an emergency switchover device 12, and normally serving to supply electric current to the control unit, the basic components like the door locks and antitheft alarm, and the comfort components such as the window lifters.

In addition, the vehicle is provided with an emergency battery 11, normally received in the trunk or luggage compartment or within the interior of the vehicle to be less endangered in a crash, the emergency battery 11 being connected via the circuit 12 to the control unit to operate only the basic components when an undervoltage is detected by the control unit indicate a failure of the starter battery, the removal or some other inability of the starter battery to supply the requisite voltage to maintain normal operation.

Simultaneously with the connection of the emergency battery 11 into the circuit, the control unit 2 deactivates the comfort components. In the embodiment illustrated, the basic functions includes those of all the vehicle door locks 4, the antitheft alarm 6 and optionally the trunk lock 13, especially when the starter battery 10 is provided in the trunk of the vehicle.

Since the vehicle door locks 4 are each electrically operable via an electric motor drive both for unlocking and for shifting into the antitheft mode, when the basic components are said to be operable by the battery 11, we mean to indicate that both of these functions will remain intact for all door locks even upon failure of the starter battery.

The control unit can include a transponder interrogating receiver 14 at an outer side of the vehicle, usually at the driver side door, which can be activated mechanically by the key blade 8a of the remote unit T to activate a transponder 8b in the key. The transponder interrogating receiver 14 and the transponder 8b can include code word memories, so that upon interrogation, a code word is transmitted to the vehicle and can be compared with the code word stored in the transceiver or some other memory of the vehicle whereby the lock can be released upon satisfactory comparison of the code words. The system to that extent can operate as has been described in German Patent Document DE 44 27 253 A1 (now U.S. Pat. 5,623,170 issued Apr. 22, 1997, attorney's docket number 19730).

In FIG. 1A, a portion of one of the vehicle doors 18 with its door lock 4 is shown to a larger scale and, as shown, is equipped with an additional emergency unit 17 individual to that door. Corresponding units 17 may be provided for all of the doors.

Figure 2:
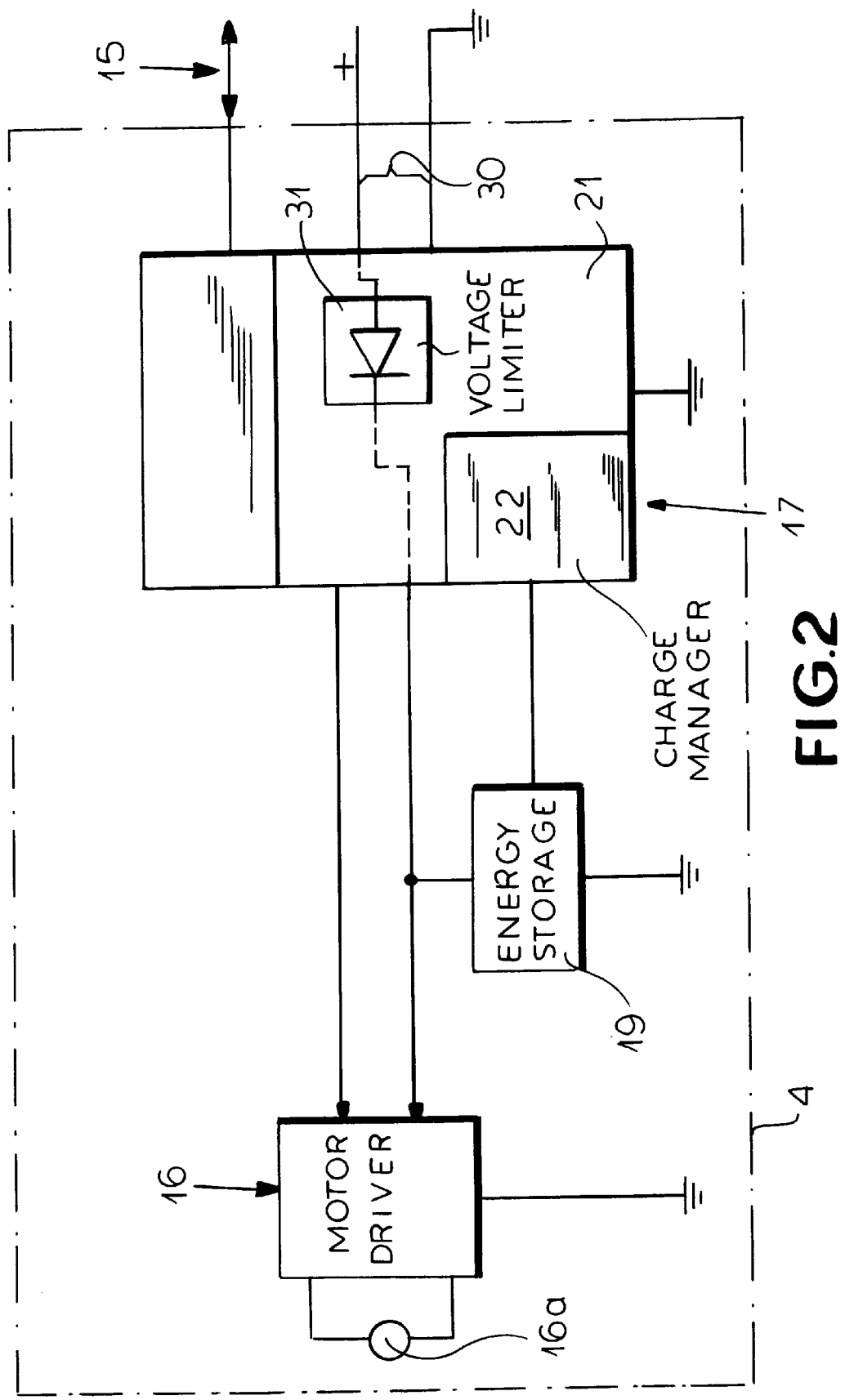
FIG. 2 is a diagram of the emergency circuitry added at each vehicle door according to the invention and corresponding to the circuit shown in FIG. 1.

FIG. 2 shows the addition to the control system provided by the invention, i.e. an emergency unit 17 for each of the door locks.

The control line to the emergency unit 17 is represented at 15 and, of course, is connected to the bus 3. The door lock mechanism is operated by an electric motor 16a which is energized by a motor driver circuit 16 as is conventional in the art. The mechanical parts of the system have not been shown nor is the motor driver 16 illustrated in any detail. As is conventional when the starter battery 10 is effective, the motor driver 16 can be energized either by operation of one of the actuators 7 or by the transmitter 8 of the remote control unit T. In the latter case, the control unit 2 receives the signals from the receiver 9 which are transmitted by the remote control unit T. If the battery 10 has been removed or the level of charge of the battery 10 falls below the threshold, say 11.4 volts in a 12 volt system, the failure of the starter battery is detected by the control unit 2 which operates the switchover unit 12 to connect the emergency battery to the system and cut off the comfort components while maintaining the basic components operable.

Figure 3:
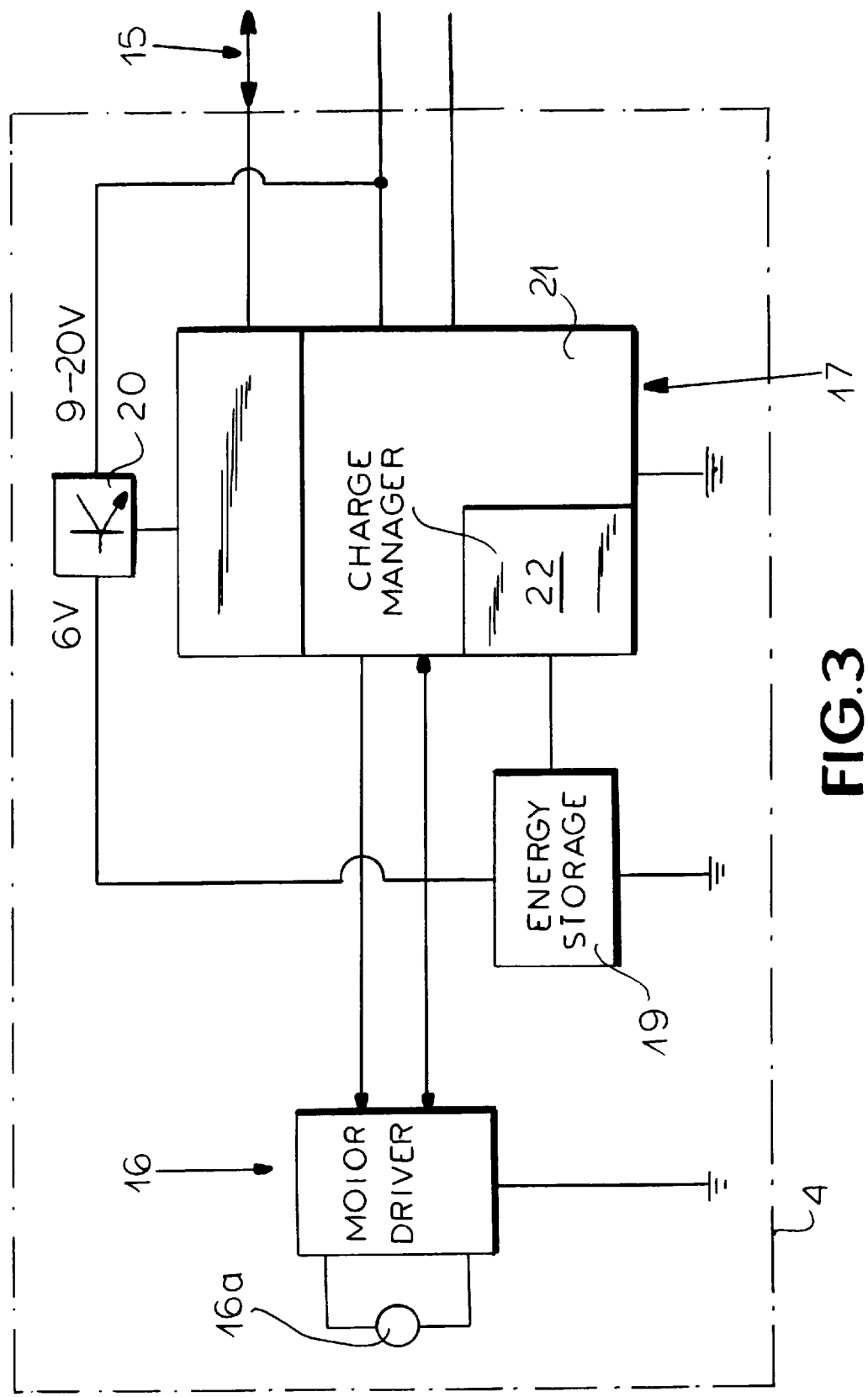
FIG. 3 is a diagram similar to FIG. 2 showing a preferred embodiment of the emergency unit for such vehicle.

In addition, or as an alternative to the emergency battery 11 and the switch unit 12, each emergency operating unit 17 can comprise an emergency energy source 19 which may be a storage battery, capacitor or other energy storage source which is built into the door lock 4 whose casing is represented by dotdash lines in FIGS. 2 and 3. The emergency energy source can be charged from the generator or alternator of the vehicle directly or indirectly from the battery 10 or battery 11 via the lines 30 through a controller 21 which can have a so-called electronic charge manager 22 which maintains the charge in the energy storage unit 19.

It is important for the present invention that the motor driver 16 and the energy storage unit 19 be dimensioned to operate at significantly lower voltages than that which is provided by the starter battery 10 and which is normally used to operate the electrical system.

A voltage limiting system represented diagrammatically at 31 can, for example, be provided to charge the energy storage unit 19 and drive the motor 16a via the motor driver. The voltage limiter can be a transistor circuit 20 as shown in FIG> 3 which is identical FIG. 2 except for the type of voltage limiter used. For starter battery voltages from 9 to 20 volts, the transistor circuit can reduce the voltage applied to the motor driver 16 and the energy storage unit 19 to for example 6 volts. When the charge manager 22 so signals, the transistor circuit 20 can close to apply 6 volts to the energy storage unit and the motor driver. The voltage limiting enables a relatively small motor driver and motor to be used and smaller energy storage to e provided at 19 and permits the entire door lock assembly to be smaller while increasing reliability of the system and its ability to overcome problems in the case of a crash or other accident which may disable one or another of the door locks.

We claim:

1. An electrical control system for an automotive vehicle, comprising:
    a starter battery;
    a control unit connected to said starter battery and provided actuator with means for actuating said control unit;
    a plurality of electrically operated door locks connected to said control unit and responsive to said actuator means whereby said starter battery energizes said door locks; and
    an emergency unit in each of said door locks and including:
        a respective motor driver operatively connected to the respective door lock, an emergency controller connected to said control unit and to said motor driver, energy source continuously connected between said starter battery and said motor driver and chargeable to supply energy to said motor driver, and
        voltage limiting circuitry formed by a transistor circuit responsive to a voltage of said starter battery for limiting the voltage applied to said source and said motor driver to a voltage substantially lower than that of said starter battery.

2. The electrical control system as defined in claim 1 wherein a respective said emergency unit is provided at each of said door locks.

3. The electrical control system as defined in claim 2 wherein each emergency unit is provided on a component circuit board of the respective door lock.

4. The electrical control system as defined in claim 2 wherein each emergency unit is encapsulated within a housing of the respective door lock.

5. An electrical control system for an automotive vehicle, comprising:

a starter battery;

a control unit connected to said starter battery and provided with actuator means for actuating said control unit;

a plurality of electrically operated motor vehicle components connected to said control unit and responsive to said actuator means whereby said starter battery energizes said components in a normal mode; and an emergency unit at at least one of said components and including:
  a respective motor driver operatively connected to said one of said components for operating same,
  an emergency controller connected to said control unit and to said motor driver,
  an energy source continuously connected between said starter battery and said motor driver and chargeable to supply energy to said motor driver, and
  voltage limiting circuitry formed by a transistor circuit responsive to a voltage of said starter battery for limiting the voltage applied to said source and said motor driver to a voltage substantially lower than that of said starter battery.

6. The electrical control system as defined in claim 5 wherein a respective said emergency unit is provided at each of a plurality of said components.

7. The electrical control system as defined in claim 6 wherein at least some of said components are respective door locks and each emergency unit for a respective door lock is built directly into the housing of the respective door lock.

8. An electrical control system for an automotive vehicle, comprising:

a starter battery;

a control unit connected to said starter battery and provided actuator with means for actuating said control unit;

a plurality of electrically operated door locks connected to said control unit and responsive to said actuator means whereby said starter battery energizes said door locks; and an emergency unit in each of said door locks and including:
  a respective motor driver operatively connected to the respective door lock, an emergency controller connected to said control unit and to said motor driver, energy source continuously connected between said starter battery and said motor driver and chargeable to supply energy to said motor driver, and
  voltage limiting circuitry formed by a transistor circuit responsive to a voltage of said starter battery for limiting the voltage applied to said source and said motor driver to a voltage substantially lower than that of said starter batter, a respective said emergency unit being provided at each of said door locks, each of said emergency units being encapsulated within a housing of the respective door lock, all of said door locks being connected with said control unit by a single wire multiplex bus, said actuator means including a plurality of actuators fixed on the vehicle and connected to said control unit and a receiver connected to said control unit and responsive to a remote control, said control unit being provided with a switchover switch for alternative connection of an emergency battery and said starter battery to said control unit.

* * * * *